United States Patent
Rising

(10) Patent No.: US 8,019,119 B2
(45) Date of Patent: Sep. 13, 2011

(54) WAVELET DETECTOR FOR FINDING SIMILARITIES BETWEEN MAJOR BOUNDARIES IN IMAGES

(75) Inventor: Hawley Rising, San Jose, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 0 days.

(21) Appl. No.: 12/911,680

(22) Filed: Oct. 25, 2010

(65) Prior Publication Data

US 2011/0038537 A1 Feb. 17, 2011

Related U.S. Application Data

(62) Division of application No. 11/698,485, filed on Jan. 25, 2007, now Pat. No. 7,844,119.

(51) Int. Cl.
*G06K 9/48* (2006.01)
*H04N 7/12* (2006.01)

(52) U.S. Cl. ... 382/100; 382/199; 382/260; 375/240.18; 375/240.19

(58) Field of Classification Search ............... 382/240, 382/100, 232, 248, 236, 190, 199, 159, 260, 382/233, 166, 163, 164, 165, 195; 375/240, 375/11, 240.19, 240.18, E7.075, E7.166, 375/E7.072, E7.044, E7.054, E7.051, E7.15, 375/E7.227, E7.031, E7.252, E7.042, E7.19, 375/E7.03, E7.045, E7.074, E7.254; 707/E17.021, 707/999.004; 345/589; 348/672
See application file for complete search history.

(56) References Cited

U.S. PATENT DOCUMENTS

| | | | |
|---|---|---|---|
| 5,828,848 A | 10/1998 | MacCormack et al. | |
| 6,385,329 B1 | 5/2002 | Sharma et al. | |
| 6,611,627 B1 | 8/2003 | LaRossa et al. | |
| 6,944,332 B1 | 9/2005 | Brechner | |
| 7,206,359 B2 * | 4/2007 | Kjeldsen et al. | 375/316 |
| 7,391,880 B2 | 6/2008 | Reed et al. | |
| 7,522,762 B2 | 4/2009 | Rea et al. | |
| 7,548,650 B2 * | 6/2009 | Qamhiyah et al. | 382/181 |
| 7,630,466 B2 * | 12/2009 | Momtaz et al. | 375/350 |
| 2003/0118248 A1 | 6/2003 | Kyong | |
| 2006/0034541 A1 | 2/2006 | Perlmutter et al. | |
| 2006/0088219 A1 * | 4/2006 | Zhang et al. | 382/224 |

OTHER PUBLICATIONS

Ivan Christov, "Multiscale Image Edge Detection", 1.130/18.327, Spring2004,Final Project, May 12, 2004, pp. 1-14.

(Continued)

*Primary Examiner* — Sheela Chawan
(74) *Attorney, Agent, or Firm* — Haverstock & Owens LLP

(57) ABSTRACT

A method of and a system for finding similarities between major boundaries of images using a wavelet detector is described herein. Unimportant edges of the image are disregarded by eliminating Gaussian wavelet coefficients and Haar wavelet coefficients of lower significance. Comparison between the images is made on the basis of quantized color, sign and magnitude of the Haar wavelet coefficients. The method performs the comparison between images in two steps. First, the method checks for exact matches between the Haar wavelet coefficients to determine whether the images are very similar. This is followed by binning of the coefficients into nine spatial bins in the image. A representative is assigned to each of the bins in terms of color, orientation and sign. Each bin of one image is compared with all the bins of the other image. Thus, images that are similar but not identical are still detected.

6 Claims, 6 Drawing Sheets

OTHER PUBLICATIONS

Woon Chung Chan et al., "A Wavelet and Canny based Image Comparison", Faculty of Information Technology, Monash University, Melbourne, Australia, Conference on Cybernetics and Intelligent Systems Singapore, Dec. 1-3, 2004, pp. 329-333.

Fikri Goksu et al., "Edge Adapted Wavelet Transform for Image Compression", Electrical and Computer Engineering Department, University if Minnesota, Dec. 1-3, 2004.

Stephane Mallat, "Characterization of Signals from Multiscale Edges", IEE Transactions on Pattern Analysis and Machine Intelligence, vol. 14, No. 7, Jul. 1992, pp. 710-732.

John Canny, "A Computational Approach to Edge Detection", IEEE Transactions on Pattern Analysis and Machine Intelligence, vol. PAMI-8, No. 6, Nov. 1986, pp. 679-698.

* cited by examiner

WAVELET DETECTOR FOR FINDING SIMILARITIES BETWEEN MAJOR BOUNDARIES IN IMAGES

This Patent Application is a divisional of co-pending U.S. patent application Ser. No. 11/698,485, filed on Jan. 25, 2007, and entitled "Wavelet Detector For Finding Similarities Between Major Boundaries In Images." The patent application Ser. No. 11/698,485, filed on Jan. 25, 2007, and entitled "Wavelet Detector For Finding Similarities Between Major Boundaries In Images," is hereby incorporated by reference.

FIELD OF THE INVENTION

The present invention relates to the field of imaging. More specifically, the present invention relates to detecting boundaries in images.

BACKGROUND OF THE INVENTION

Images that are not simply one color contain at least one edge and usually many edges. Edges are abrupt changes in the brightness of the image. For example, if an image contains a red airplane in a gray and cloudy sky, there are edges where the airplane outline meets the blue sky. Since the brightness distinction between these two objects is likely very high, the edges are considered to be strong. However, for the gray-white clouds and the gray sky, there is still an edge at the border of each cloud, but they will likely be considered weak since they are not very distinct. Since edges are able to be represented mathematically, they are able to be used in image comparison as well as for other image based purposes.

Mallat and Zhong teach a method of edge-wavelet multi-resolution analysis for image representation and compression in their paper, "Characterization of signals from multiscale edges," published in IEEE Transactions on Pattern Analysis and Machine Intelligence, 14, 7, 710-732, 1992. Image compression is achieved in their work by finding and keeping only the local extrema in their edge-wavelet coefficients. Finding local extrema of image gradients as an edge detector is commonly known as Canny's edge detector proposed by F. Canny, in his paper, "A computational approach to edge detection," IEEE Transactions on Pattern Analysis and Machine Intelligence, vol. PAMI-8, 6, 679-698, November 1986. Mallat and Zhong also teach a method of image reconstruction from edge-wavelet extrema by iterative projection onto feasible solution sets. The iterative projection method is too computationally intensive, and hence too time-consuming to be of practical use on commonly available image processing computers such as personal computers. It currently takes several hours to process a single image using the iterative projection method.

Previous attempts at image comparison/matching have many drawbacks. Many prior attempts did not take a transform of the image; they simply took the sign of coefficients from the images and then compared the signs of two images adding to a running total for every match to achieve a score. Depending on the score, there either was or was not a match. In addition to being computationally expensive, typically they focus on one aspect of the images and ignore the rest. For example, the method described above by Mallat and Zhong focuses only on edges of the images. Thus, if two images have similar edges, they are viewed as matching. However, there are clearly problems with only using the edges for matching. For instance, a person's head and a volleyball are both round and similar in size, thus will have similar edges. However, when a person is searching for an image of a volleyball, the search would be ineffective if images of people interfered with the search.

SUMMARY OF THE INVENTION

A method of and a system for finding similarities between major boundaries of images using a wavelet detector is described herein. Unimportant edges of the image are disregarded by eliminating Gaussian wavelet coefficients and Haar wavelet coefficients of lower significance. Comparison between the images is made on the basis of quantized color, sign and magnitude of the Haar wavelet coefficients. The method performs the comparison between images in two steps. First, the method checks for exact matches between the Haar wavelet coefficients to determine whether the images are very similar This is followed by binning of the coefficients into nine spatial bins in the image. A representative is assigned to each of the bins in terms of color, orientation and sign. Each bin of one image is compared with all the bins of the other image. Thus, images that are similar but not identical are still detected.

In one aspect, a method of determining edges of an image comprises calculating a Gaussian wavelet coefficient of the image, retaining the Gaussian wavelet coefficient, wherein the Gaussian wavelet coefficient is above a first threshold, calculating a Haar wavelet coefficient of the image, retaining the Haar wavelet coefficient, wherein the Haar wavelet coefficient is co-positioned near a non-zero Gaussian wavelet coefficient and calculating a color of an edge represented by the Gaussian wavelet coefficient and the Haar wavelet coefficient. The method further comprises retaining the Gaussian wavelet coefficient, wherein the Gaussian wavelet coefficient is not above the first threshold, but is a neighbor of a retained coefficient and is above a second threshold, wherein the second threshold is lower than the first threshold. The method further comprises discarding the Gaussian wavelet coefficient, wherein the Gaussian wavelet coefficient is below the first threshold and is not a neighbor of a retained coefficient. The method further comprises discarding the Gaussian wavelet coefficient, wherein the Gaussian wavelet coefficient is below the first threshold and is a neighbor of a retained coefficient but is not above a second threshold, wherein the second threshold is lower than the first threshold. The method further comprises discarding the Haar wavelet coefficient, wherein the Haar wavelet coefficient is co-positioned near a non-zero Gaussian wavelet coefficient. The Haar wavelet coefficient is retained by storing a corresponding quantized color, sign and magnitude.

In another aspect, a method of comparing two or more images comprises determining if a match exists between a first set of coefficients of a first image and a second set of coefficients of an additional image, binning the first set of coefficients and the second set of coefficients each into N bins if there is not the match between the first set of coefficients and the second set of coefficients and performing a regional comparison of the first set of coefficients and the second set of coefficients using the bins. The method includes N is equal to 9. Performing the regional comparison of the first set of coefficients and the second set of coefficients using the bins includes comparing each bin from the first image with each bin from the additional image. The method further comprises calculating a Gaussian wavelet transform of the first image and the additional image, calculating a Haar wavelet transform of the first image and the additional image and calculating a reduced color version of the first image and the additional image. The first set of coefficients and the second set of coefficients are Haar wavelet coefficients. The Haar wavelet coefficients are retained by storing a representative quantized color, sign and magnitude. The quantized color, sign and magnitude are compared for each of the first set of coefficients and the second set of coefficients.

In another aspect, a method of locating one or more images comprises selecting a first image to search for, comparing the first image with an additional image, wherein comparing comprises: determining if a match exists between a first set of coefficients of the first image and a second set of coefficients the additional image, binning the first set of coefficients and the second set of coefficients each into N bins if there is not the match between the first set of coefficients and the second set of coefficients and performing a regional comparison of the first set of coefficients and the second set of coefficients using the bins and retrieving the additional image that is similar to the first image. The method includes N is equal to 9. Performing the regional comparison of the coefficients using the bins includes comparing each bin from the first image with each bin from the additional image. Comparing further comprises calculating a Gaussian wavelet transform of the first image and the additional image calculating a Haar wavelet transform of the first image and the additional image and calculating a reduced color version of the first image and the additional image. Selecting comprises entering in a keyword upon which an image matching that keyword is utilized to compare. Selecting is performed by a user. The first set of coefficients and the second set of coefficients are Haar wavelet coefficients. The Haar wavelet coefficients are retained by storing a representative quantized color, sign and magnitude. The quantized color, sign and magnitude are compared for each of the first set of coefficients and the second set of coefficients. Similarity between the first image and the additional image depends on a score established by the Haar wavelet coefficients. Comparing and retrieving occurs via the Internet. Comparing and retrieving occurs on a computing device selected from the group consisting of a personal computer, laptop, digital camera, digital camcorder, handheld, iPod® and home entertainment system.

In another aspect, a system for locating data comprises an image, one or more sets of data and a program to search for the image wherein the search comprises: determining if a match exists between a first set of coefficients of the image and a second set of coefficients the one or more sets of data, binning the first set of coefficients and the second set of coefficients each into N bins if there is not a match between the first set of coefficients and the second set of coefficients and performing regional comparison of the first set of coefficients and the second set of coefficients using the bins. The system includes N is equal to 9. Performing regional comparison of the coefficients using the bins includes comparing each bin from the image with each bin from the one or more sets of data. Comparing further comprises calculating a Gaussian wavelet transform of the image and the one or more sets of data, calculating a Haar wavelet transform of the image and the one or more sets of data and calculating a reduced color version of the image and the one or more sets of data. The one or more sets of data are selected from the group consisting of images and videos. The program uses a keyword to determine the image to compare. The program uses the image selected by a user to compare. The program retrieves the one or more sets of data which are similar to the image. The program lists the one or more sets of data according to similarity to the image. The first set of coefficients and the second set of coefficients are Haar wavelet coefficients. The Haar wavelet coefficients are retained by storing a representative quantized color, sign and magnitude. The quantized color, sign and magnitude are compared for each of the first set of coefficients and the second set of coefficients. The similarity between the first image and the one or more sets of data depends on a score established by the Haar wavelet coefficients. The program searches over the Internet. The program searches on a computing device selected from the group consisting of a personal computer, laptop, digital camera, digital camcorder, handheld, iPod® and home entertainment system.

DETAILED DESCRIPTION OF THE PREFERRED EMBODIMENT

Figure 1:
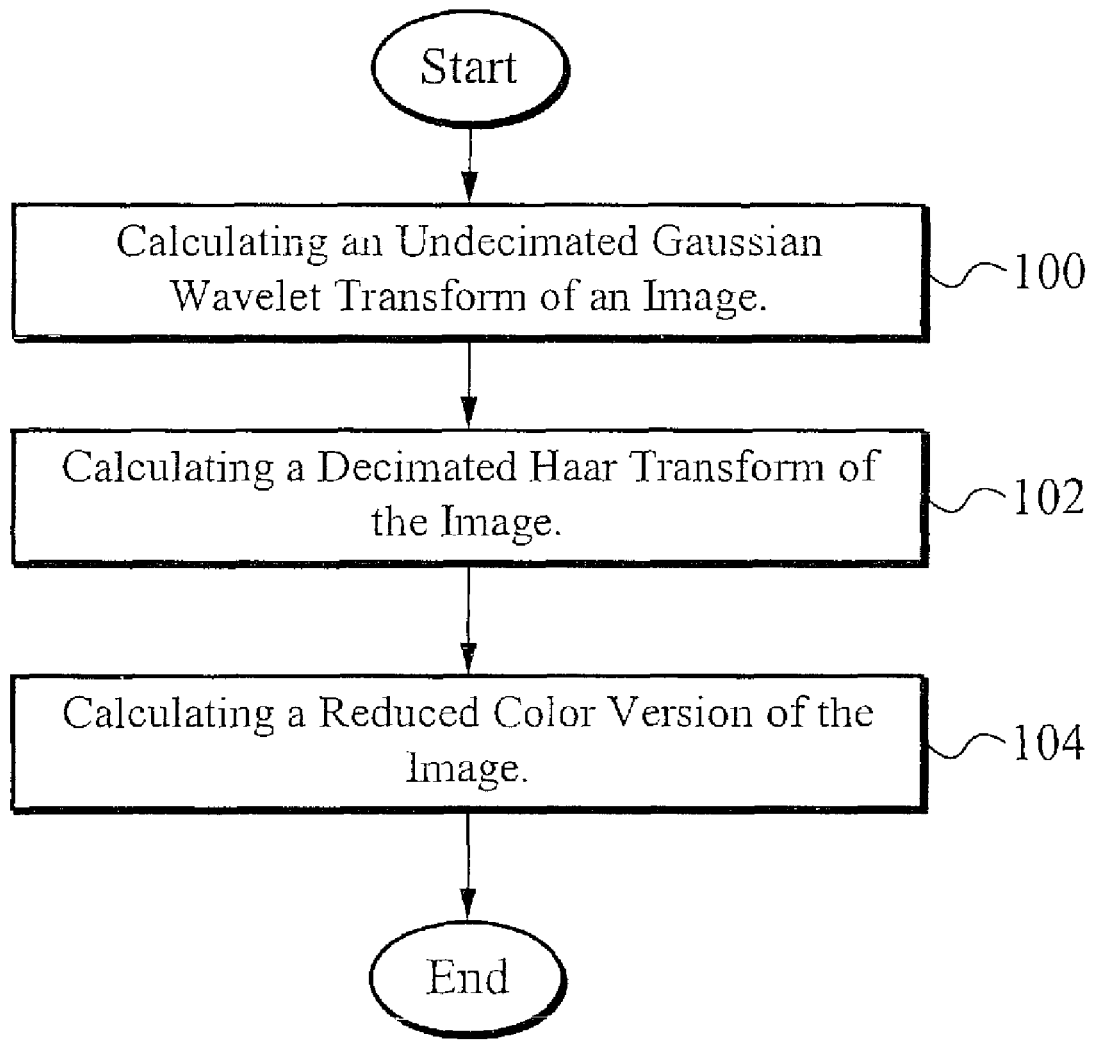
FIG. 1 illustrates a flowchart of a process of generating a description of an image.

A wavelet detector is described herein as a software program. Those skilled in the art will readily recognize that the equivalent of such software is able to also be constructed in hardware and/or firmware. Since image manipulation algorithms and systems are well known, the present description is directed in particular to algorithms and systems forming part of, or cooperating more directly with, the wavelet detector described herein. Other aspects of such algorithms and systems, and hardware and/or software for producing and otherwise processing the image signals involved therewith, not specifically shown or described herein may be selected from such systems, algorithms, components and elements known in the art. Given the method as described according to the invention in the following materials, software not specifically shown or described herein that is useful for implementation of the invention is conventional and within the ordinary skill in such arts.

Still further, as used herein, the software program is able to be stored in a computer readable storage medium, which may include, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

A method of and an apparatus for finding similarities between major boundaries of images using a wavelet detector is described herein. Unimportant edges of the image are disregarded by eliminating Gaussian wavelet coefficients and Haar wavelet coefficients that do not meet certain requirements. The Gaussian wavelet coefficients are retained only if they are above a certain threshold value or if they are neighbors of a coefficient that is retained and are above a lower threshold. Coefficients from the Haar wavelet transform are retained if they are positioned near a non-zero coefficient of the Gaussian wavelet transform, wherein near refers to being proximate within a Gaussian wavelet/Lipshitz exponent chart. Comparison between the images is made on the basis of quantized color, sign and magnitude of the Haar wavelet coefficients. By using color as a criterion for comparison, the method eliminates chances of matchups between edges of different objects in one image and the edge of a single object in the other. The method performs the comparison between images in two steps. First, the method checks for exact matches between the Haar wavelet coefficients to determine whether the images are very similar. This is followed by binning of the coefficients into nine spatial bins in the image. A representative is assigned to each of the bins in terms of color, orientation and sign. The method compares each bin of one image with all the bins of the other image. This allows detecting images that are similar in layout but not identical in positioning of the objects in the images.

The process begins with a description of an image being generated by calculating the following: 1) an undecimated Gaussian wavelet transform of the image, 2) a decimated Haar transform of the image and 3) a reduced color version of the image. Then, curves in the undecimated wavelets that have a sufficiently low Lipschitz exponent are found, or previously found curves are continued. The Lipschitz exponent is calculated by the strength of the undecimated wavelets over several scales. The Haar coefficients that do not coincide with the curves calculated by the Lipschitz exponent are suppressed. By suppressing certain coefficients, noise and other issues are eliminated. The color of the edges represented by the coefficients are also calculated. The strongest Haar coefficients are coded with their sign, their logarithm and the color. Nine spatial bins similar to a tic-tac-toe board are used to separate the image into multiple segments. The quantity of these coefficients in each of the nine spatial bins in the image are found and compared with those similarly calculated for another image. The result is a robust feature descriptor that respects color boundaries, respects change in position and size, and compares images based on the sharpest and longest lines in the image.

Several issues of standard wavelet feature detectors are addressed: position invariance and getting rid of spurious object boundaries formed by several objects. Lipschitz exponents are used to find strong edges, as they were used in Mallet and Zhong. However, by abbreviating the process and not doing the steepest descent processing, the process is sped up significantly. Furthermore, the results are combined with color tagging. Haar wavelets are binned to be able to compare images if an object in the image has moved.

The wavelet detector described herein addresses several concerns with wavelet-based feature detectors. Unimportant edges and noise are weeded out using a variation on the method of Mallet and Zhong. The image is filtered using a fast Infinite Impulse Response (IIR) filter that calculates a continuous Gaussian wavelet transformation of the image. All derivatives of the Gaussian are suitable as wavelet bases. The standard deviation of the Gaussian chosen is a parameter for optimizing the performance of this part of the feature detector.

A variation on the Lipschitz exponent calculation is done here. The undecimated wavelets are calculated at several scales. Then the values at the different scales are compared while the tests are done to continue the edge (location of proper neighbors using Bresenham's circle algorithm). If the undecimated coefficients pass the test, the Haar coefficients are kept. Wavelet coefficients are kept if they are above a certain threshold, or if they are neighbors of a coefficient that is being kept, and are above a lower threshold. The threshold is able to be lower than the previous threshold because it is a neighbor of a coefficient that is already being kept. A Haar wavelet transform of the image is also done, and coefficients are kept from the Haar transform if they are co-positioned near a non-zero coefficient of the Gaussian. The coefficient is kept by storing its quantized color, sign and magnitude.

After the coefficients are determined, the images are compared in two ways. 1) Exact matches between coefficients are searched for which gives a measure for determining when two images are very similar, and they are weighted for the sub-band of the wavelet. This ensures that the comparison is a distance measure, such that it will automatically choose an exact match as the best possible score. 2) The coefficients are binned into nine bins. Each bin is assigned a representative in terms of color, orientation (e.g. magnitude of three wavelet components) and sign. Using the bins, each section of an image is able to be compared to each section of another image, thus if an object is simply moved, but still within the image, this will be detected. For example, there are two pictures of people playing volleyball, one where the volleyball is on one side of the net and the second image with the volleyball on the other side of the net. If a straight image comparison were used, the images would likely not match up because the volleyball edges are in very different locations. However, utilizing the bins, the volleyball is in bin 1 in the first image and bin 3 in the second image, and those two bins are compared, thus the image will be correctly matched.

The process is very efficient to calculate, since each stored coefficient is stored in a double word, and since the first compare is only on existing coefficients for an exact match. Since the second compare requires an averaging step and then a 9-fold compare, it is also efficient.

Many improvements are realized by implementing the process described herein.

1) The straight wavelet feature detector is corrected by getting rid of edges that are not relevant to major shapes. The combination of the Gaussian wavelet cleaning and the Haar cleaning done with the Gaussian wavelets achieves this.

2) Edges of similar color are correlated, which eliminates chance matchups between edges of different objects in one image and the edge of a single object in the other.

3) By mixing the results of an exact match comparison with a regional comparison (on the nine bins), images are allowed if they have repositioned objects, or are only similar in layout but not identical in positioning to find each other. This does not happen with straight wavelet feature detectors because wavelets are notoriously not position invariant. Position invariance is also derived from the Gaussian wavelet transform. Since this is a continuous wavelet transform and undecimated, it is position invariant. Thus, representations that are closer than they would be in a straight wavelet detector or at least comparable are obtained.

The feature detector is able to be used for most Content Based Image Retrieval (CBIR) tasks. Given suitable processing speed, the feature detector is also able to be used to perform content retrieval on video sequences by keyframe. The feature detector is also able to be used to build filters to find or filter out image types that are either desirable or undesirable (for example, adult content filtering).

FIG. 1 illustrates a flowchart of a process of generating a description of an image. In the step 100, an undecimated Gaussian wavelet of the image is calculated. In the step 102, a decimated Haar wavelet of the image is calculated. In the step 104, a reduced color version of the image is calculated. Preferably, the reduced color version is 16 colors and 4 bits.

Figure 2:
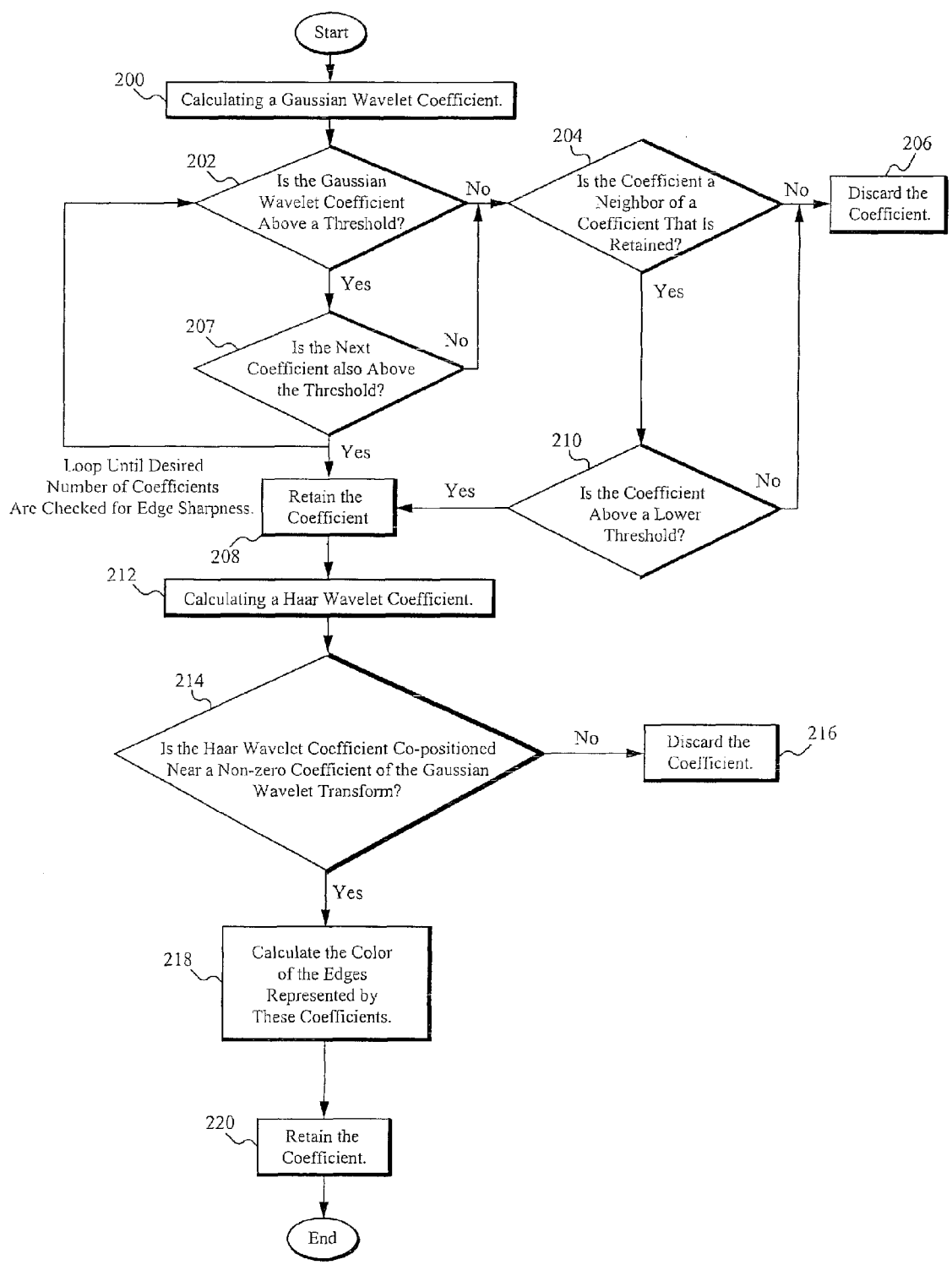
FIG. 2 illustrates a flowchart of a process of determining strong edges of images.

FIG. 2 illustrates a flowchart of a process of determining strong edges of images. In the step 200, a wavelet transform of an image is calculated. Preferably, the wavelet transform is an undecimated Gaussian wavelet transform. In the step 202, Lipschitz exponents are calculated to determine which wavelet transforms are kept and which are discarded. Wavelet transforms that are above a threshold represent sufficiently strong edges. If, in the step 202, the Gaussian wavelet coefficient is above a threshold related to the Lipschitz exponents, then it is determined if the next coefficient is also above the threshold in the step 207. If the next coefficient is also above the threshold, then the loop continues at the step 202 until a desired number of coefficients are checked for edge sharpness and then the coefficient is retained in the step 208. If, in the step 202, the Gaussian wavelet coefficient is not above the threshold, then it is determined if the coefficient is a neighbor of a coefficient that is already retained, in the step 204. Also, if in the step 207, the next coefficient is not above the threshold, then it is determined if the coefficient is a neighbor of a coefficient that is already retained, in the step 204. If, in the step 204, the coefficient is not a neighbor of a previously retained coefficient, then the coefficient is discarded, in the step 206. In the step 204, if the coefficient does neighbor a retained coefficient, then it is determined if the coefficient is above a lower threshold in the step 210. If the coefficient is not above a lower threshold in the step 210, then the coefficient is discarded, in the step 206. If the coefficient is above a lower threshold in the step 210, then the coefficient is retained, in the step 208. Then, in the step 212, a Haar wavelet coefficient is calculated using the Gaussian wavelet coefficient. Preferably, the Haar transform is a decimated Haar transform. In the step 214, it is determined if the Haar wavelet coefficient is co-positioned near a non-zero coefficient of the Gaussian wavelet transform. If the Haar wavelet coefficient is not co-positioned near a non-zero Gaussian wavelet coefficient, then the Haar wavelet coefficient is discarded in the step 216. If the Haar wavelet coefficient is co-positioned near a non-zero Gaussian wavelet coefficient, then the Haar wavelet coefficient is retained in the step 220, after the color of the edges represented by the coefficients are calculated in the step 218. The Haar wavelet coefficient is retained by storing its quantized color, sign and quantized magnitude.

Figure 3:
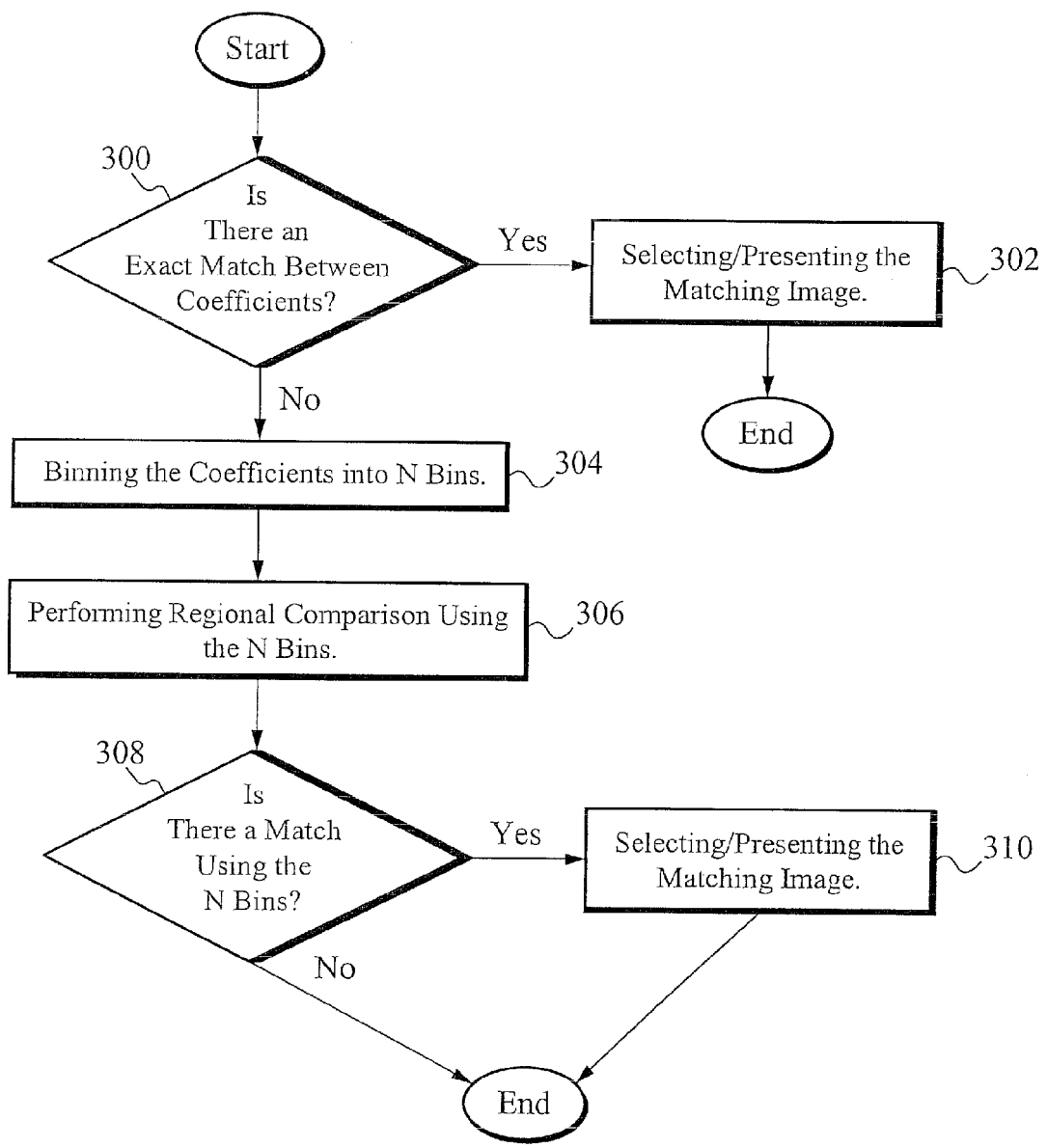
FIG. 3 illustrates a flowchart of a process of comparing two images.

FIG. 3 illustrates a flowchart of a process of comparing two images: an image to be recognized and a possibly matching image. In the step 300, it is determined if there is an exact match between coefficients determined above. If there is an exact match between the coefficients in the step 300, then the matching image is selected or presented depending on the implementation, in the step 302. If there was not an exact match in the step 300, then the coefficients are binned into N bins, in the step 304. Preferably, N is equal to nine. In the step 306, regional comparisons are performed using the N bins. In the step 308, if there is a match using the nine bins, then the matching image is selected or presented in the step 310. If there is no match using the N bins in the step 306, then the process finishes without finding a match. In some embodiments, an absence of a match is indicated.

One of the applications the wavelet detector described herein is able to be utilized for is Content-Based Image Retrieval (CBIR) also known as Query By Image Content (QBIC) and Content-Based Visual Information Retrieval (CBVIR). CBIR is the application of computer vision to the image retrieval problem of searching for digital images in large databases. "Content-based" means that the search uses the contents of the images themselves, rather than relying on metadata such as titles, captions or keywords. CBIR is needed and useful because of the limitations in metadata-based systems in addition to the increased bandwidth and processing power of the Internet. Textual information about images is easily searched using current technology, but requires those descriptions to be input by someone, which is highly burdensome and impractical when dealing with extremely large amounts of data. Furthermore, keyword searches for text have their own drawbacks such as requiring a user to accurately phrase his search, otherwise the search could result in nothing found.

CBIR systems are implemented in a number of different ways. One example permits a user to make a request, similar to a keyword search, such as "rabbit" and any images of rabbits are retrieved. However, unlike a keyword search where the word "rabbit" is searched for, the search looks for matching characteristics of an image that has a rabbit. Other systems search for texture, color and shape or even faces. The search could begin with a sample image provided by the user or via specifications of color schemes and textures. The results are returned in a variety of ways, and in some embodiments, they are sorted in ascending order starting with the smallest distance which correlates to the closest match. Another method of returning results only returns those images whose distance falls within a designated acceptable range. Of course, the accuracy of the search depends on how well the technology is able to match the user's image with those in the database. The wavelet detector is able to improve accuracy of a user's search as described above.

Alternatively, instead of the search being across the Internet, CBIR implementing the wavelet detector is performed on a local intranet or even on a user's computing device such as a personal computer, laptop, digital camera, digital camcorder, handheld, iPod® and home entertainment system. For example, if a user wants to find all of their baby pictures on the computer, they are able to use the aforementioned technologies and retrieve all pictures that resemble a baby.

Another application the wavelet detector is utilized with is a content recognition system. The content recognition system for indexing occurrences of objects within an audio/video content data stream processes the stream of data to generate a content index database corresponding to the content stream. The content stream is processed by applying recognition technology utilizing the wavelet detector to the content within the content stream to identify and index occurrences of identified objects. In an embodiment, the content stream is processed as the content stream is stored within a media storage device. Alternatively, the content stream is processed after the content stream is stored within the media storage device. The objects that are included within the index database, are identified dynamically by the recognition technology using the wavelet detector during processing. As the content stream is processed, an entry for each object is generated within the index database. In some embodiments, each entry includes an object identifier and corresponding locations of that object. The locations reference where the particular content is stored within the media storage device. Once the content index database is generated, it is able to then be used to quickly locate and navigate to specific occurrences of content and objects within the content stream. The objects that are able to be identified and indexed include any identifiable information within a content stream, including shapes, objects, events and movements within video streams. In some embodiments, the content index database is stored on the same media storage device as the content stream.

Figure 4:
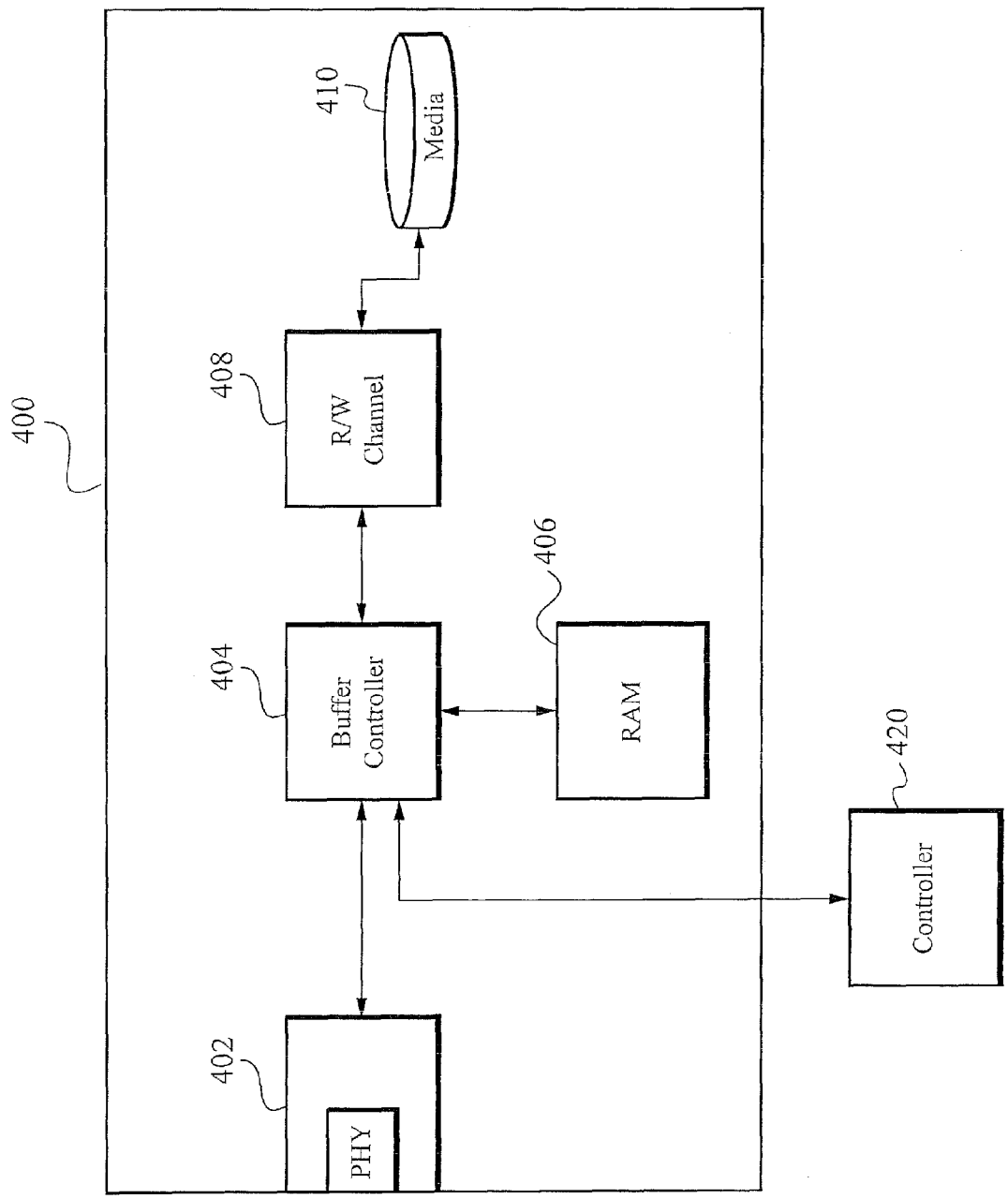
FIG. 4 illustrates a block diagram of a media storage device with an external controller implementing the wavelet detector.

A media storage device with external controller is illustrated in FIG. 4. The media storage device 400 includes an interface circuit 402 for sending communications to and receiving communications from other devices coupled to the media storage device 400. The interface circuit 402 is coupled to a buffer controller 404. The buffer controller 404 is also coupled to a RAM 406 and to a read/write channel circuit 408.

The read/write channel circuit 408 is coupled to media 410 on which data is stored within the media storage device 400. The read/write channel circuit 408 controls the storage operations on the media 410, including reading data from the media 410 and writing data to the media 410. An external controller 420 is coupled to the buffer controller 404 for controlling the processing, classifying and indexing of data streams stored on the media 410.

As the stream is processed, the recognition engine using the wavelet detector within the controller 420 analyzes the content within the content stream to identify the appropriate objects within the content stream. As described above, the appropriate objects are dynamically identified by the recognition engine during processing. As appropriate objects within the content stream are identified, the occurrence of those identified objects within the content stream is then recorded within an index database. Once the content stream is processed and the index database is generated, the user then has the capability to jump to locations within the content stream where the desired object occurs, for viewing or editing the content stream.

Figure 5:
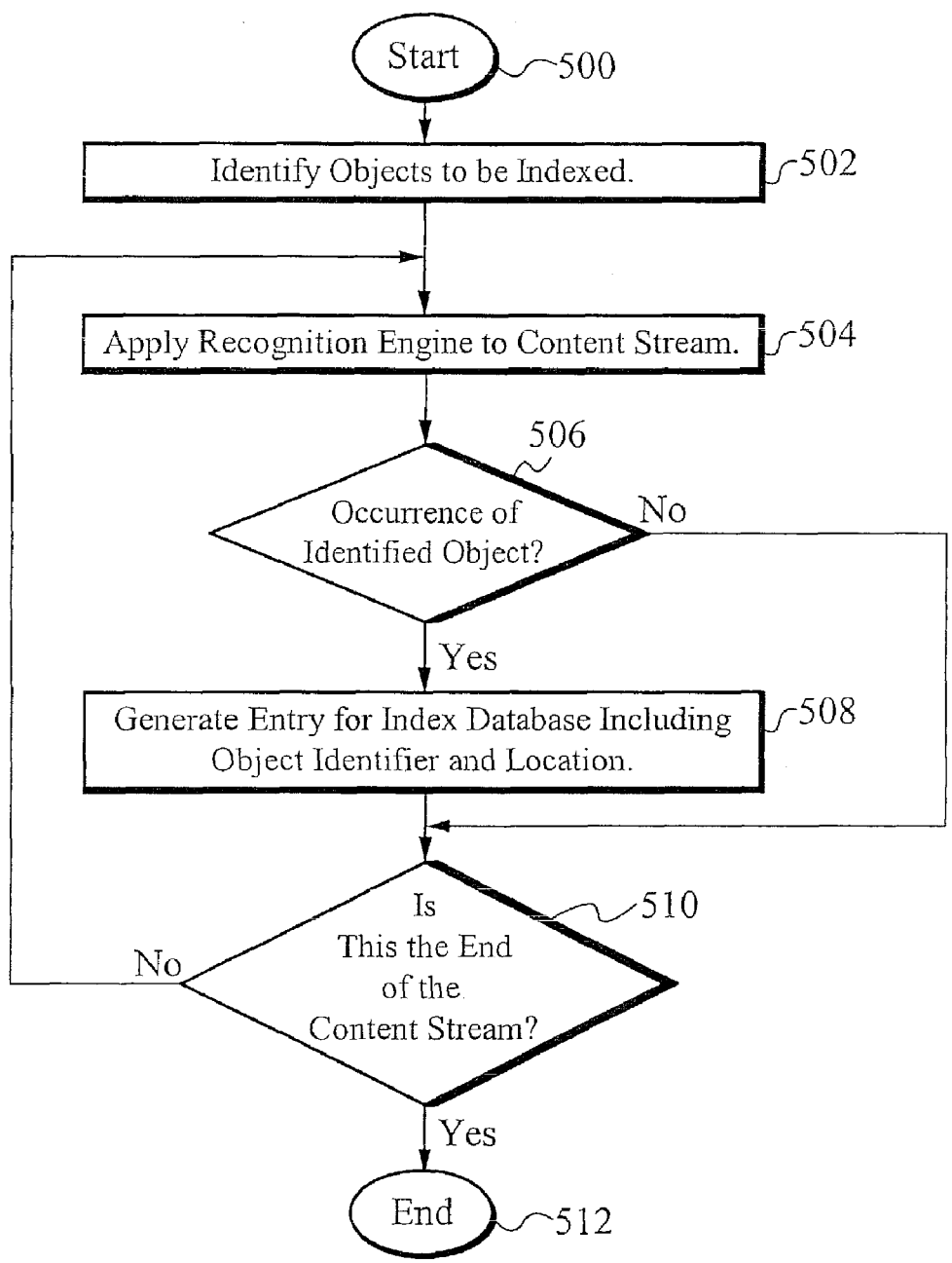
FIG. 5 illustrates a flowchart showing the steps implemented by the controller and the media storage device during processing of a content stream to generate an index database.

A flowchart showing the steps implemented in some embodiments by the controller 420 and the media storage device 400 during processing of a content stream to generate an index database is illustrated in FIG. 5. The process starts at the step 500. At the step 502, the objects to be indexed and included in the index database are identified. As described above, this identification is performed manually by the user or dynamically by the recognition technology using the wavelet detector during processing. At the step 504, the recognition engine or recognition technology is then applied to the content stream to analyze the content stream and determine the occurrence of identified objects within the content stream.

At the step 506, it is determined whether the content within the content stream that is currently being analyzed includes an identified object. If the content currently being analyzed does include an identified object, then at the step 508, an entry is generated for the index database, including the object identifier entry within the object category and an entry identifying the corresponding location of the content within the location category. After the generation of the entry for the index database at the step 508, or if it is determined at the step 506, that the content currently being analyzed does not include an identified object, it is then determined at the step 510, if there is more content within the content stream, or if this is the end of the content stream. If it is determined that the content stream has not yet been fully processed, then the process jumps back to the step 504, to continue processing the content stream. If it is determined at the step 510 that all of the content stream has been processed, then the process ends at the step 512.

Figure 6:
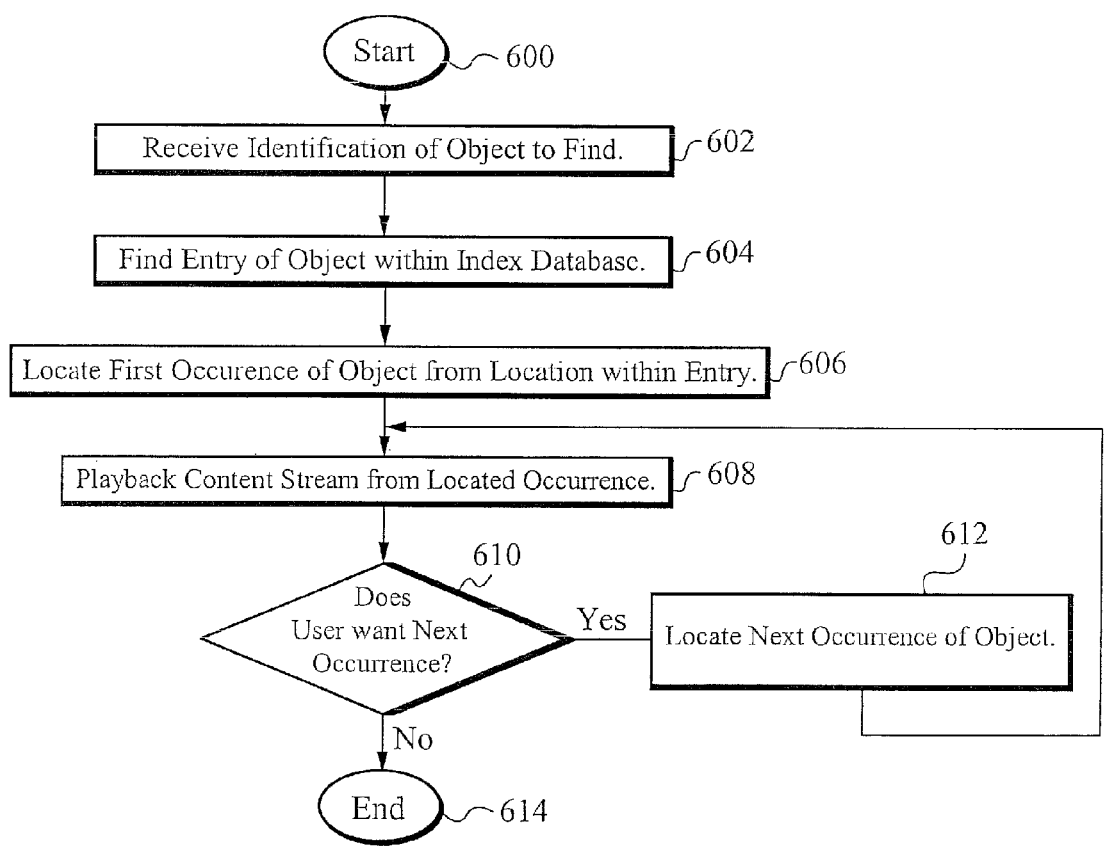
FIG. 6 illustrates a flowchart showing the steps implemented by the controller and the media storage device during playback of a content stream.

A flowchart showing the steps implemented in some embodiments by the controller 420 and the media storage device 400 during playback of a content stream, that has a corresponding index database, is illustrated in FIG. 6. The process starts at the step 600. At the step 602, a user identifies an object that they would like to locate within the content stream. At the step 604, the entry corresponding to the identified object is located within the index database and the location of the first occurrence of the object is targeted, using the entries from the object category and the location category. At the step 606, the first occurrence of the object is located within the content stream. At the step 608, this occurrence of the object is then played back for the user. At the step 610, it is then determined if the user wants the next occurrence of the object located and played back. If the user does want the next occurrence of the object located and played back, then the next occurrence of the object is located at the step 612. The process then jumps to the step 608 to playback this next occurrence. If it is determined at the step 610 that the user does not want the next occurrence of the object located and played back, the process then ends at the step 614.

As an example of the operation of the content recognition system and index database of the present invention, a user records a video of their child's birthday on a tape within a video recorder. This video includes audio and video components. The video is then recorded from the tape to a media storage device 400. Under the control of the controller 420 in conjunction with the media storage device 400, the video is processed to generate the index database by applying recognition technology including the wavelet detector to the video components to determine each occurrence of an identified object within the content stream. As described above, this processing occurs either as the video is recorded on the media storage device 400, if the user's system has the processing capability to perform the processing online, or after the video is stored on the media storage device 400. During processing the video is analyzed to determine each occurrence of an identified object. As an occurrence of an identified object is found within the video, an entry corresponding to that occurrence is then added to the index database. For example, if the user identifies that they want every occurrence of a birthday cake within the video indexed, the recognition technology is then applied to the video content stream to determine every occurrence of the birthday cake within the video. These occurrences are identified and indexed within the index database, as described above. If the user then wants to view these occurrences or edit the video based on these occurrences, the system will utilize the index database to playback these occurrences of the birthday cake within the video or edit the video based on the occurrences of the birthday cake within the video.

Alternatively, instead of generating an index database, a search system is implemented so that a user is able to request a search for something like a birthday cake, the system searches through the video and the images/video involving a birthday cake are queued to be viewed.

The wavelet detector described herein is utilized in a number of applications but generally is utilized to efficiently find edges in images and determine similarities between two or more images. Furthermore, unlike previous attempts, the wavelet detector herein utilizes Gaussian wavelet coefficients, Haar wavelet coefficients and color information so that quantized color, sign and magnitude are used to compare images. By using more data, better comparisons are possible. By providing better image recognition, the wavelet detector herein improves the abilities of any implementation that requires image comparison.

In operation the wavelet detector improves the image comparison capabilities of whatever system it is utilized with. As shown above, when two images are similar to the human eye, but are technically dissimilar because of mathematical idiosyncrasies, the wavelet detector is able to much better compare the images like a human would. When implemented with the aforementioned technologies or any other technology that would benefit from the wavelet detector, the wavelet detector functions by comparing color, sign and magnitude information from determined using Gaussian wavelet coefficients, Lipschitz exponents and Haar wavelet coefficients. For example, when a user performs an image search and selects an image to find, the wavelet detector ensures that the search results in the most closely related images. The wavelet detector described herein is an extremely useful addition to any tool implementing image comparison.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of determining edges of an image comprising:
   a. calculating a Gaussian wavelet coefficient of the image;
   b. retaining the Gaussian wavelet coefficient, wherein the Gaussian wavelet coefficient is above a first threshold;
   c. calculating a Haar wavelet coefficient of the image;
   d. retaining the Haar wavelet coefficient, wherein the Haar wavelet coefficient is co-positioned near a non-zero Gaussian wavelet coefficient; and
   e. calculating a color of an edge represented by the Gaussian wavelet coefficient and the Haar wavelet coefficient.

2. The method as claimed in claim 1 further comprising retaining the Gaussian wavelet coefficient, wherein the Gaussian wavelet coefficient is not above the first threshold, but is a neighbor of a retained coefficient and is above a second threshold, wherein the second threshold is lower than the first threshold.

3. The method as claimed in claim 1 further comprising discarding the Gaussian wavelet coefficient, wherein the Gaussian wavelet coefficient is below the first threshold and is not a neighbor of a retained coefficient.

4. The method as claimed in claim 1 further comprising discarding the Gaussian wavelet coefficient, wherein the Gaussian wavelet coefficient is below the first threshold and is a neighbor of a retained coefficient but is not above a second threshold, wherein the second threshold is lower than the first threshold.

5. The method as claimed in claim 1 further comprising discarding the Haar wavelet coefficient, wherein the Haar wavelet coefficient is co-positioned near a non-zero Gaussian wavelet coefficient.

6. The method as claimed in claim 1 wherein the Haar wavelet coefficient is retained by storing a corresponding quantized color, sign and magnitude.

* * * * *